(12) United States Patent
Mol

(10) Patent No.: US 8,956,003 B2
(45) Date of Patent: Feb. 17, 2015

(54) LIGHTED DOWNRIGGER DEPTH METER

(76) Inventor: Wayne Raymond Mol, Osceola, MI (US)

( * ) Notice: Subject to any disclaimer, the term of this patent is extended or adjusted under 35 U.S.C. 154(b) by 167 days.

(21) Appl. No.: 13/484,630

(22) Filed: May 31, 2012

(65) Prior Publication Data
US 2013/0322065 A1 Dec. 5, 2013

(51) Int. Cl.
*F21L 4/00* (2006.01)
(52) U.S. Cl.
USPC .............................. 362/191; 43/17.6; 43/27.4
(58) Field of Classification Search
CPC ........................................................ F21L 4/00
USPC ............... 362/191; 43/17.5, 17.6, 27.4, 42.31
See application file for complete search history.

(56) References Cited

U.S. PATENT DOCUMENTS

| | | | | |
|---|---|---|---|---|
| 5,351,538 A * | 10/1994 | McGuire et al. | ................. | 73/301 |
| 7,343,261 B1 * | 3/2008 | Kell | ................................ | 702/127 |
| 7,607,253 B2 * | 10/2009 | Makowski | ..................... | 43/17.5 |
| 2006/0016117 A1 * | 1/2006 | Aanenson | ...................... | 43/27.4 |
| 2007/0242134 A1 * | 10/2007 | Zernov | ............................. | 348/81 |
| 2009/0223109 A1 * | 9/2009 | Makowski | ..................... | 43/17.6 |

* cited by examiner

*Primary Examiner* — Elmito Breval

(57) ABSTRACT

The invention is a light housing with a switch that holds an LED light that shines directly on the depth meter of a standard downrigger. In the present embodiment the housing is molded plastic shaped to conform to the particular downrigger that it is to be deployed on. Other embodiments are manufactured to specific downriggers and are comprised of a light housing and switch housing. The invention shines the light directly on the depth meter for the deployment of the downrigger in low or no light conditions to allow the user to deploy the downrigger using both hands for deployment while providing a light source to shine on the depth meter allowing for precise depth positioning and avoiding damage or loss of equipment. This lighted depth meter allows the user to quickly deploy fishing equipment.

3 Claims, 3 Drawing Sheets

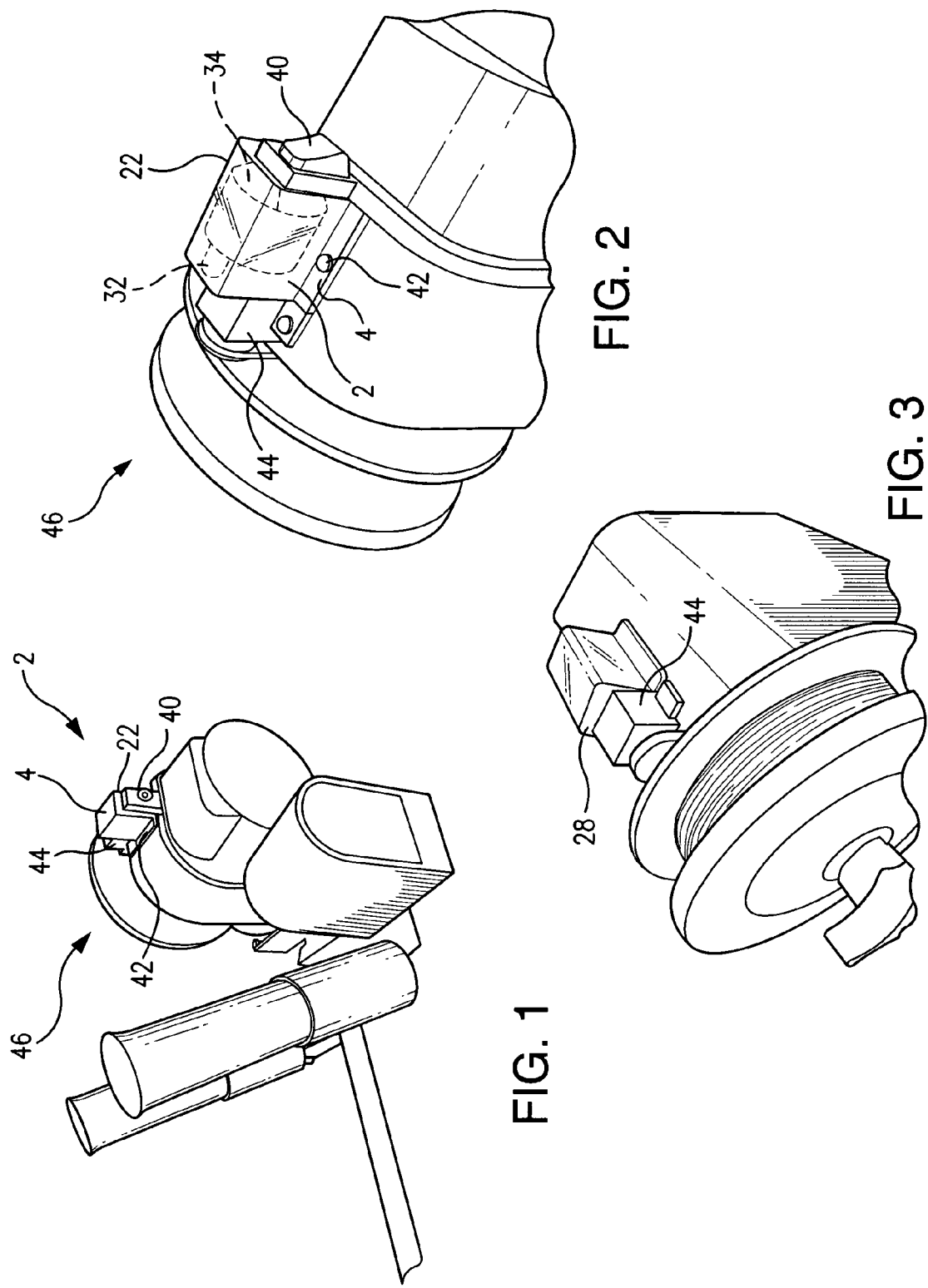

LIGHTED DOWNRIGGER DEPTH METER

BACKGROUND OF THE INVENTION

Using watercraft that are equipped with downriggers for trolling for fish is very common and popular in various areas around the world. This activity is conducted at hours of daylight and also during low light periods such as dawn and dusk as well as night. The downriggers are set at a certain depth depending on water depth and depth of fish congregation. Therefore, it is critical to success that viewing of the depth meter is possible under low or no light conditions. Because of this the fisherman must carry an additional lighting source. That source can be in the form of a flashlight, headlamp or even a lighter. The additional light source requires the fisherman to use their hands while setting the downrigger which also requires two hands. This creates a problem that leads to difficulty including the potential for the loss or damage of equipment which is expensive and time consuming. It could possibly result in the end of the fishing trip before it is even started.

Therefore, it has been discovered that coupling a light directly to the downrigger that focuses a small amount of light directly on the depth meter improves the use and deployment of a downrigger. With both hands free to operate and deploy the downrigger by being able to clearly read the depth meter, the likelihood of losing or damaging equipment is reduced significantly. It also will increase the user's ability to deploy the fishing equipment quicker allowing them to begin fishing faster.

The applicant is unaware of any prior art concerning the instant device.

THE INVENTION

The present invention is a conforming light for depth meters on fishing downriggers. The light comprises a housing. The housing has a top with an inside surface, an open bottom, an open front, two side panels, a back, and lateral extensions depending from each side panel near a bottom edge.

The open front has a clear lens covering. The back has an electrical switch mounted therein. The lateral extensions each have an opening through them. There is an LED light mounted in the top on the inside surface, near the front. The LED light is electrically connected to the electrical switch and the electrical switch is electrically connected to an electrical power source. The housing and lateral extensions are configured to and conforming to be mounted on the depth meter without interfering with the operation of the fishing downriggers.

BRIEF DESCRIPTION OF THE DRAWINGS

FIG. 1 is a view in perspective of a Walker® downrigger showing the back of the lighted depth meter.

FIG. 2 is a top view in perspective showing a Walker® downrigger showing the lighted depth meter housing.

FIG. 3 is another top view in perspective of a Walker® downrigger showing the clear lens of the lighted depth meter.

DETAILED DESCRIPTION OF THE DRAWINGS

Figure 4:
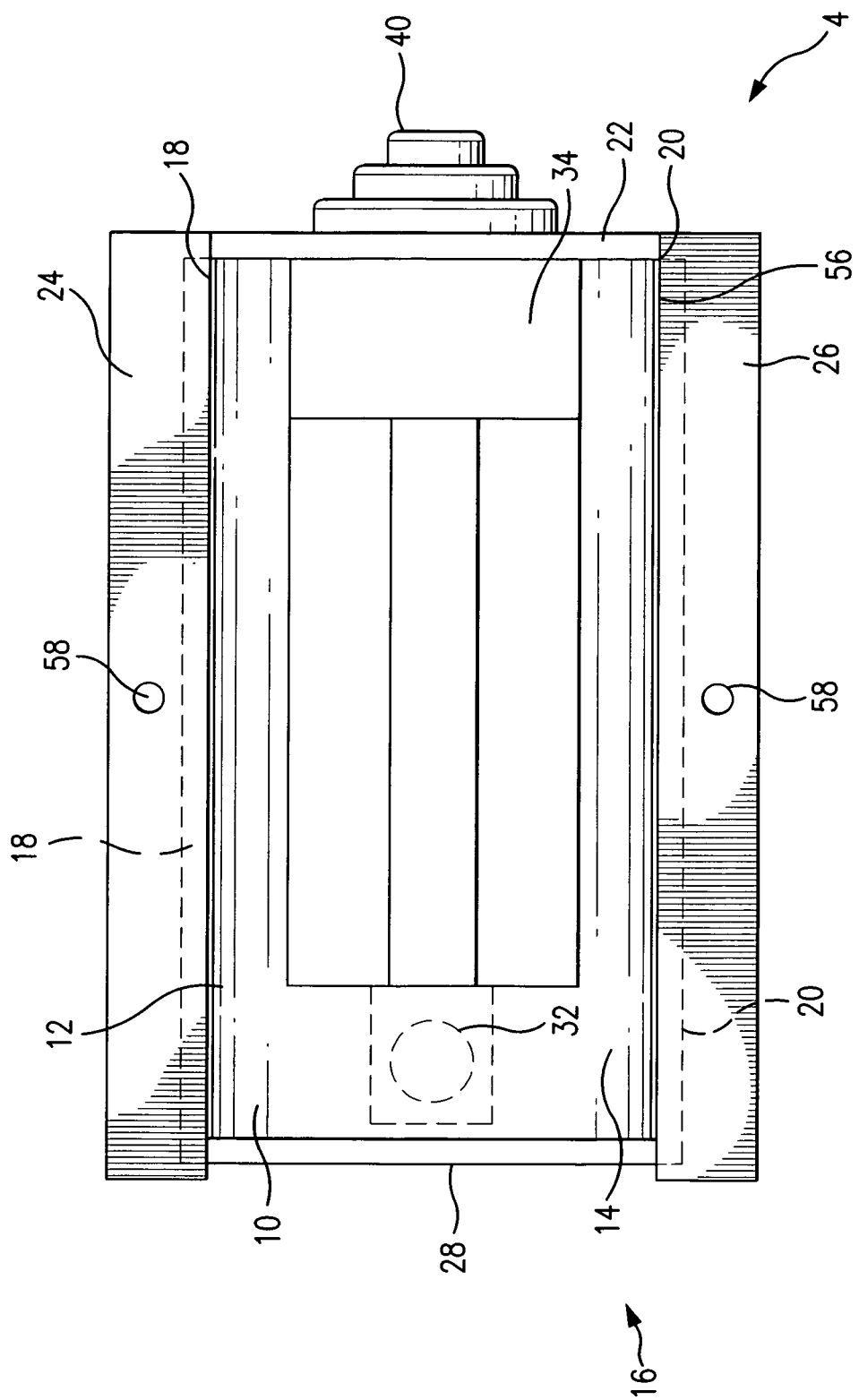
FIG. 4 shows the housing showing a clear view of the lighted depth meter through the open bottom.

FIG. 1 shows a Walker® downrigger 46 showing the back 22 of the lighted depth meter housing 4. A lighted depth meter 2 is attached directly to the downrigger 46 via fasteners 42. The back 22 of the housing 4 has a switch 40 that operates the light 32 (not shown). The housing 4 is manufactured to focus the LED or light 32 directly on the depth meter 44 of the downrigger 46.

A fisherman uses a downrigger 46 to lower baits or lures to a certain depth and then holds that lure at that approximate depth while trolling the lure in water in an attempt to catch fish. This is understood in the art as well as the operation for deploying the weight with the lure loosely attached thereto and also attached to fishing line and a fishing pole. When attempting to deploy the downrigger weight with the lure attached the user must lower the downrigger 46 which is generally electrically driven by a power switch. Some downriggers are manual cranks. In order to accomplish this operation the user needs both hands free to deploy the downrigger 46. These standard downriggers 46 do not have a light provided. In order to perform the operation an additional light is needed. It has been discovered that the present invention allows the user to turn on the present device 2 and then deploy the downrigger 46 while monitoring the depth meter 44 while releasing the weight into the water below. The first embodiment is manufactured to be implemented on Walker® downriggers 46 with mechanical depth meters.

FIG. 2 shows a Walker® downrigger 46 showing the lighted depth meter housing 4. The LED light 32 is mounted on the inside surface 12 of the housing 4 (shown in phantom). It is clear from this Figure that the lighted depth meter 2 is mounted directly next to the depth meter 44 by fasteners 42. The on/off switch 30 is located on the back 22. The user stands behind the downrigger 46 to operate. It is clear that once the switch 40 is turned on the operator can operate the downrigger 46 and view the depth meter 44 from the operating position.

FIG. 3 shows a walker® downrigger 46 showing the clear lens 28 of the lighted depth meter 2. This view shows the close proximity of the lighted depth meter 2 to the depth meter 44. This allows the LED or light 32 to shine directly and only on the depth meter 44.

FIG. 4 shows the housing 4 showing a clear view of the lighted depth meter 2 through the open bottom 14. The housing 4 has a top 10 with an inside surface 12, an open bottom 14, an open front 16, a first side panel 18, a second side panel 20, a back 22, a first lateral extension 24 and a second lateral extension 26 depending from each of side panels 18 and 20 near a bottom edge 56 thereof. The open front 16 has a clear lens covering 28. The back 22 has an electrical switch 40 mounted therein. The lateral extensions 24 and 26 each have an opening therethrough 58.

There is an LED light 32 mounted in the top 10 on the inside surface 12 thereof, near the front 16. The LED light 32 is electrically connected by an electrical connector 34 to the electrical switch 40 and the electrical switch 40 is electrically connected to an electrical power source 38 (not shown).The power source 38 is a battery either as part of the watercraft's electrical system or in addition to the watercraft's electrical system to run accessories. The housing 4 and lateral extensions 24 and 26 are configured to and conforming to be mounted near the depth meter 44 without interfering with the operation of the fishing downriggers 46.

Figure 5:
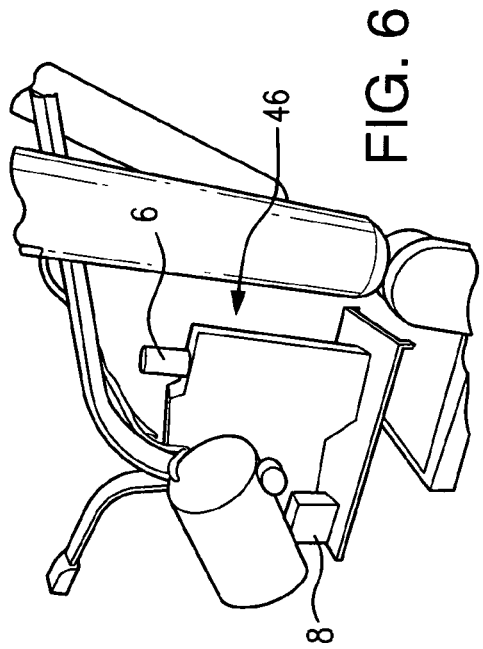
FIG. 5 shows another embodiment of the lighted depth meter that features a separate light housing mounted on a Big Jon® downrigger.

FIG. 5 shows another embodiment of the lighted depth meter 2 that shows a separate light housing 6. Here the device 2 is constrained by obstacles and takes the form of a switch housing 8 (shown in FIG. 6) and a light housing 6. The spirit of the invention is the same. The light housing 6 is directly adjacent to the depth meter 44 and the switch housing 6 is located lower of the downrigger 46. The power source 38 (not shown) is connected to the switch housing 6 and it is in turn connected to the light housing 6 for controlling the LED 32 that shines directly on the depth meter 44. The second embodiment is manufactured to implement on Big Jon® downriggers with mechanical depth meters.

Figure 6:
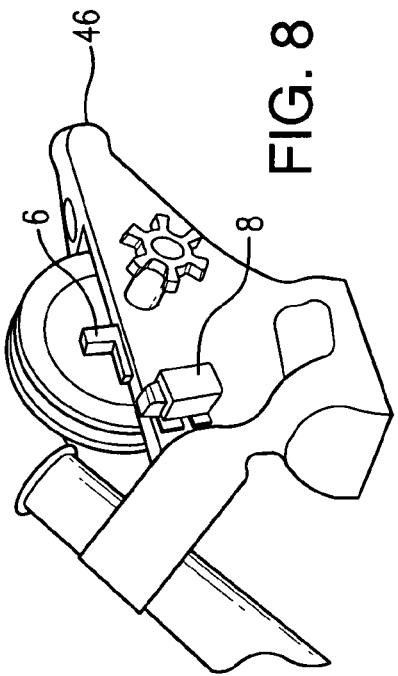
FIG. 6 shows another embodiment of the lighted depth meter that features a separate light housing and separate switch housing mounted on a Big Jon® downrigger.

FIG. 6 shows another embodiment of the lighted depth meter 2 that features a separate light housing 6 and separate switch housing 8. Here the switch housing 8 is clearly visible mounted to the downrigger 46 in an area that is easily accessed.

Figure 7:
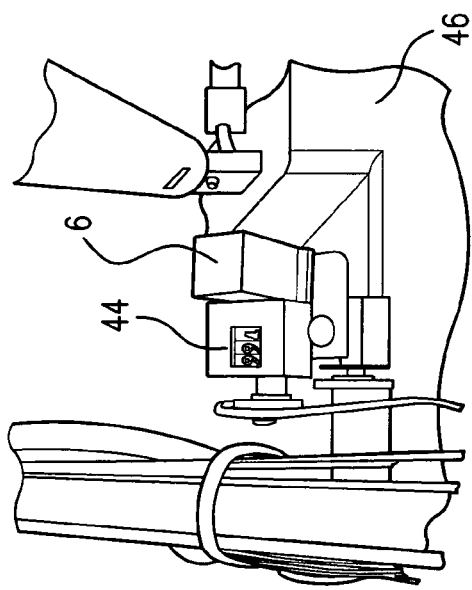
FIG. 7 shows yet another embodiment of a lighted depth meter that features a separate light housing and separate switch housing mounted on a Cannon® downrigger.

FIG. 7 shows yet another embodiment of a lighted depth meter 2 that features a separate light housing 6 and separate switch housing 8. Here again the constraints of the Cannon downrigger 46 require that the light housing 6 and the switch housing 8 are separated to fit on the downrigger 46. Here the switch housing 8 is much closer to the light housing 6 and again are connected to the power source 38 and each other to allow for the electrical current that energizes both the light housing 6 and the switch housing 8.

Figure 8:
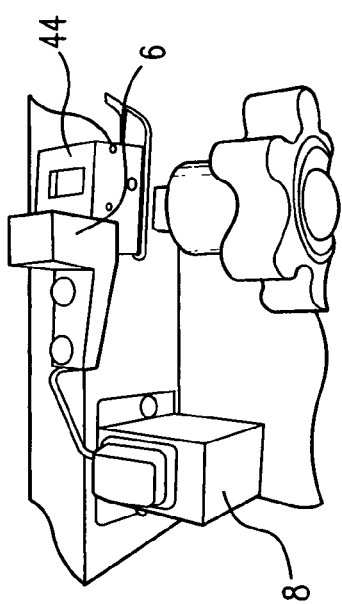
FIG. 8 shows the third embodiment of the lighted depth meter from the side that features a separate light housing and separate switch housing mounted on a Cannon® downrigger.

FIG. 8 shows the third embodiment of the lighted depth meter 2 from the side that features a separate light housing 6 and separate switch housing 8.

The third embodiment is manufactured to be implemented on Cannon® downriggers 46 with mechanical depth meters 44.

What is claimed is:

1. A conforming light for depth meters for direct coupling on a fishing downrigger, said light comprising:
   i. a housing, said housing having top with an inside surface, an open bottom, an open fornt, two side. panels, a back, and lateral extensions depending from each side panel near a bottom edge thereof;
   ii. Said open front having e clear lens covering;
   ill. said. back havinq. an electrical switch mounted therein;
   iv. said lateral extensions each having an opening therethrough;
   v. there being an LED light mounted in the top on the inside surface thereof, near the front;
   vi. siad LED light being electrically connected to the electrical switch, said electrical switch being electrically connected to an electrical power source;
   vii. said housing and lateral extensions being configured to and conforming to be mounted on said depth meter without interfering with the operation of the fishing downrigger.

2. A conforming light for depth meter on fishing downriggers as claimed in claim 1,wherein the housing is adapted to conform to any downrigger with mechanical depth meters.

3. A conforming light for depth meters on fishing downriggers as claimed in claim 1, wherein , in addition, the light and the switch each have a housing.

\* \* \* \* \*